June 10, 1952 R. H. HUCKNALL 2,599,919
BEVERAGE APPLIANCE
Filed Nov. 19, 1949 2 SHEETS—SHEET 2
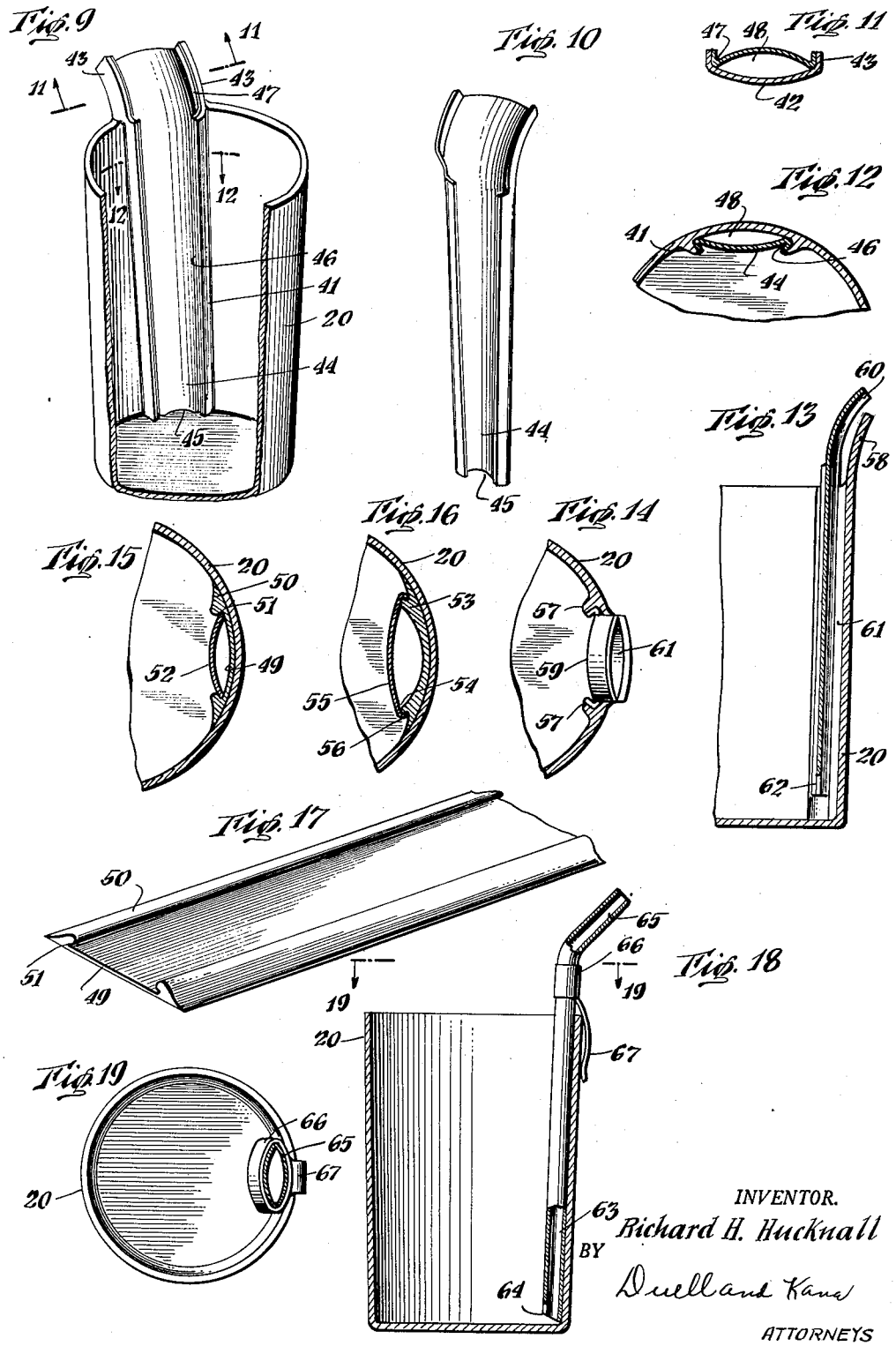
INVENTOR.
Richard H. Hucknall
BY
ATTORNEYS Patented June 10, 1952

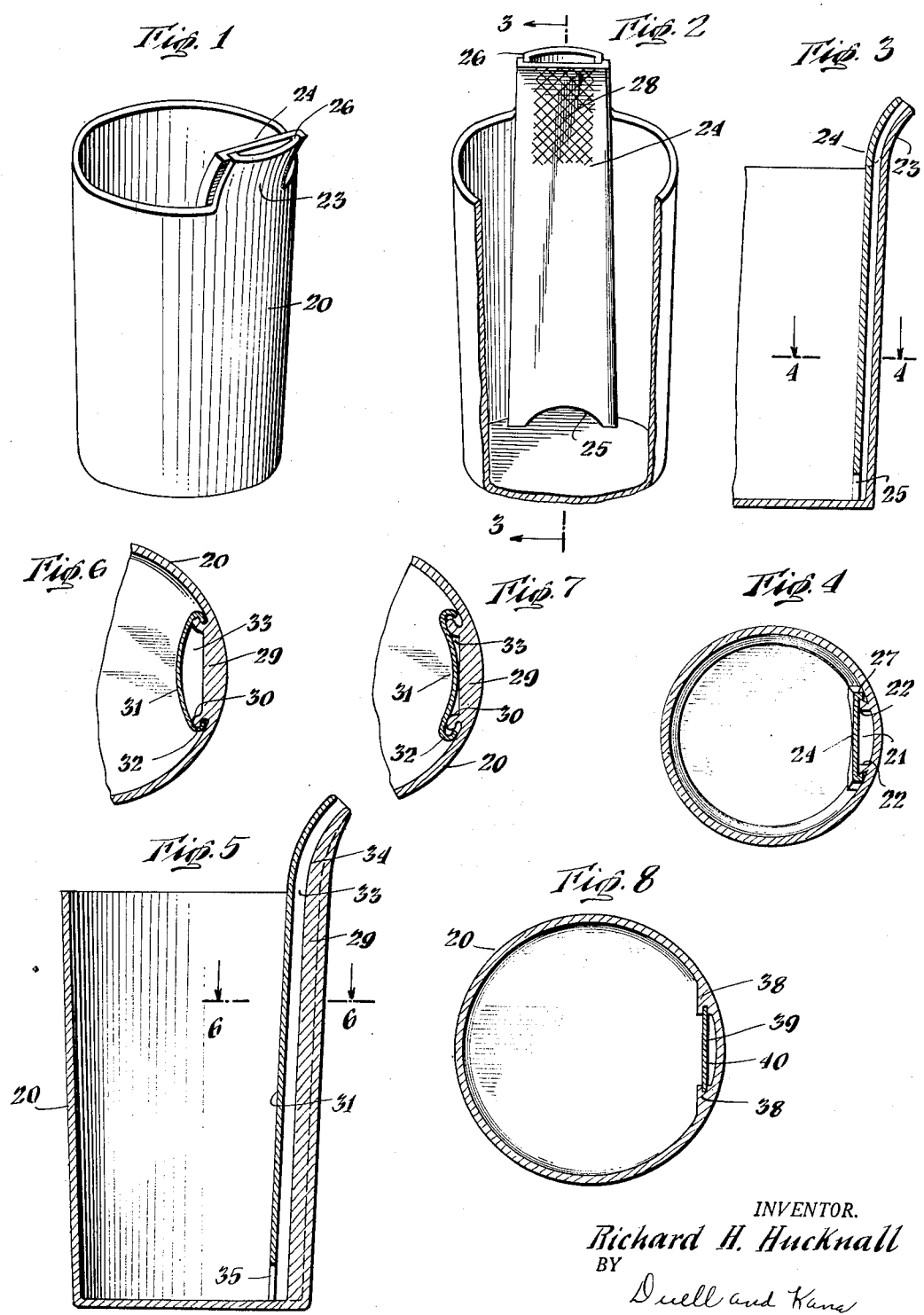

2,599,919

UNITED STATES PATENT OFFICE 2,599,919

BEVERAGE APPLIANCE

Richard H. Hucknall, Bayside, N. Y., assignor to Morrison-Bergmann Corporation, New York, N. Y., a corporation of New York Application November 19, 1949, Serial No. 128,439

1 Claim. (Cl. 65—13)

This invention relates to a structurally and functionally improved beverage appliance especially intended for the imbibing of soft drinks and also of value when used by children and invalids.

It is an object of the invention to furnish an appliance of this nature and by means of which the user may consume a beverage or liquid disposed in a container of suitable configuration and in a manner similar to that in which beverages are presently imbibed by means of hollow elements such as straws; the present invention providing a novel structure in this connection.

A further object is that of designing an assembly the several parts of which may be readily cleaned and sterilized, if desired. Moreover when so cleaned they may substantially instantaneously have their parts re-established in proper association so as to be ready for further use.

An additional object is that of furnishing an appliance of this type which may be readily and economically manufactured and the several parts of which may be assembled to furnish a device which will have a long useful life.

With these and other objects in mind, reference is had to the attached sheets of drawings illustrating practical embodiments of the invention and in which:

Fig. 1 is a perspective view of an appliance embodying the present improved construction;

Fig. 2 is a similar view but showing certain of the parts broken away to disclose underlying construction;

Fig. 3 is a sectional side view taken along the lines 3—3 and in the direction of the arrows as indicated in Fig. 2;

Fig. 4 is a transverse sectional view taken along the lines 4—4 and in the direction of the arrows as indicated in Fig. 3;

Fig. 5 is a sectional side view of an alternative form of structure;

Fig. 6 is a fragmentary sectional view taken along the lines 6—6 and in the direction of the arrows as indicated in Fig. 5;

Fig. 7 is a view similar to Fig. 6 but showing the parts in a different position;

Fig. 8 is a similar sectional view but showing an alternative form of construction;

Fig. 9 is a view similar to Fig. 2 but showing a still further form of the appliance;

Fig. 10 is a perspective view of one of the units of the construction as shown in Fig. 9;

Figs. 11 and 12 are transverse sectional views taken along the lines 11—11 and 12—12 respectively and in the direction of the arrows as indicated in Fig. 9;

Fig. 13 is a fragmentary sectional side view of a still further form of structure;

Fig. 14 is a plan view thereof with the receptacle shown in section;

Figs. 15 and 16 are sectional views similar to Fig. 6 but showing optional forms of structure;

Fig. 17 is a perspective view of a portion of an appliance prior to its association and conformation with a container;

Fig. 18 is a view similar to Figs. 3, 5, and 13 and showing a still further form of structure; and Fig. 19 is a transverse sectional view taken along the lines 19—19 and in the direction of the arrows as indicated in Fig. 18.

In these views the numeral 20 indicates a receptacle of any desired material and which may embody any preferred configuration. As shown it is conveniently in the form of a tumbler or drinking glass. It will ordinarily have a capacity such that it may readily receive substantially the contents of a soft drink bottle of conventional design. In special instances it may have a greater or lesser capacity.

In order that the contents of the receptacle may be drawn upwardly in a manner similar to that in which so-called straws are employed, the body 20 may be formed on its internal face with a channel 21 defined by side walls 22, the edges of which are conveniently undercut. Preferably in line with this channel the side wall of the receptacle is continued beyond the main edge of the latter in the form of an integral extension 23. The side walls 22 are continued through this extension in the form of walls 26 which do not have their outer edges undercut. These walls, throughout substantially their entire length, may converge in an upward direction. Even at their point of minimum spacing they are separated to a substantial extent as shown in Figs. 1 and 2. A covering member in the form of a slide 24 is applied to them and preferably has its lower edge notched as indicated at 25.

The side edges of the slide or member 24 also converge in an upward direction. These side edges are preferably defined by inwardly extending flange portions 27 which may be undercut to an extent corresponding to the undercutting of walls 22. In line with the plain side wall portions 26 defining the upper end of the channel the side walls 27 of the slide should preferably not be undercut. The length of the slide should be such that it may extend from a point adjacent the lower surface of the receptacle 20 to a point in line with the upper edge of the extension 23.

In any event it will be understood that by applying the lips to the upper end of the conduit defined by the side walls 22 and 26 and the slide member 24 a user may draw up the contents of the receptacle to a point where such contents are substantially completely exhausted. The slide 24 may be formed of any desired material such as the material of which the receptacle 20 is formed. Otherwise it may be provided of any other materials such as metal, plastic, etc. It is apparent that the slide or covering member 24 may readily be removed by simply exerting a pulling action on the same; its rear surface being conveniently roughened as indicated at 28 to assist in this action. With such upward movement, the slide will readily detach from the side walls 22 defining the passage 21. Thereupon the parts may be thoroughly cleaned. To reassemble these parts it is only necessary to move the slide or member 24 downwardly with respect to the receptacle while maintaining the position of the former with respect to the walls 22 and 26. When so assembled, the desired tubular member is again provided and through which liquids may be drawn upwardly.

As shown, the extended portion 23 of the receptacle as well as the adjacent portion of the slide are preferably curved to extend in an outward direction. This is especially desirable for the ordinary user of the appliance. In the case of children and invalids who may be partially or wholly reclining such a construction is almost essential. It is apparent in this connection that to drink the contents of the receptacle it will not be necessary to tilt the axis of the latter to any substantial extent. It is also obvious that the curvature or angular extension of portion 23 and the adjacent portion of the element might be increased over the showing in the drawings should this prove to be desirable.

In the form of structure shown in Figs. 5, 6, and 7 the receptacle 20 may be formed with a thickened wall portion 29. Adjacent the side edges of the latter lateral extensions or beads 30 may be provided. These preferably extend throughout the entire length of the thickened portion. A member 31 of a length equal to the thickened portion is provided with inturned edges 32 to embrace the edges or beads 30. Member 31 is preferably constructed of flexible material. As shown in Figs. 5 and 6 its normal condition is one in which it is inwardly bowed with respect to the axis of the receptacle. Therefore, in conjunction with the thickened portion 29 a channel 33 is provided. The maintenance of this channel is assured by the intimacy of contact between the parts 30 and 32.

As shown especially in Fig. 5, the thickened portion extends upwardly beyond the edge of the receptacle 20 and is curved outwardly as indicated at 34; the adjacent parts of member 31 being similarly curved. When it is desired to dismount member 31 then by exerting pressure upon the outer face of this member it may be caused to flex as shown in Fig. 7. Under those circumstances the distance between the inturned portions 32 is increased and these parts now disengage from the beads 30. Therefore, member 31 may be freely dismounted. After cleaning that member may again be mounted by simply bringing it to a position in proper relationship to the thickened portion 29 and exerting pressure as in Fig. 7. With the release of this pressure, parts 32 and 30 will again couple. Accordingly a channel 33 is provided throughout the entire length of the receptacle and above the upper edge of the same; the lower edge of the channel preferably terminating in a notch 35.

In the structure shown in Figs. 5 to 7, the side edges defining the channel need not converge. Similarly the structure shown in Fig. 8 does not require any tapering of the parts although this may be resorted to if desired. In that view the receptacle 20 is formed with thickened or buttress portions 38 which have their spaced opposed faces grooved to receive a slide member 39. Thus, the latter may readily be slid into position and removed from position as desired with respect to the thickened portions 38 so as to provide a channel to render the interior of the latter accessible. It is apparent that in accordance with the teachings in the previously described figures the lower end of this channel may present an intake opening or notch. Likewise its upper end preferably extends materially above the edge of the receptacle and may be curved laterally as in Figs. 1 and 5.

As in Figs. 9 to 12 the receptacle 20 may be provided with inwardly extending longitudinal ribs 41. These project somewhat acutely from the surfaces from which they extend. Therefore, they furnish an undercut face in their inner spaced edges. In line with these ribs the receptacle is extended as indicated at 42 by an integral tongue portion which is preferably curved outwardly. This tongue portion presents walls or ribs 43 which are not undercut. A slide or member 44 of any desired material may be provided in a length equivalent to the depth of receptacle 20 plus its extension 42. The lower edge of this slide may be notched as at 45. Its side edges are extended outwardly and inwardly as indicated at 46 throughout the length of ribs 41. Above those ribs and adjacent the flanges or ribs 43 these side edges are merely extended outwardly as indicated at 47.

Preferably as shown, ribs 41 converge downwardly. Likewise slide or member 44 is tapered in that direction. It is apparent that with the body of that slide bowed outwardly as shown, that a channel 48 is furnished extending from the upper edge of the extension 42 to a point adjacent the base of the receptacle when the slide is in position. The slide may readily be removed by simply exerting a pull on the same in an upward direction. A separating of the parts will result almost instantaneously if these parts are tapered as described. Likewise a remounting of the parts after cleaning may readily be achieved by simply sliding member 44 downwardly within the body of the receptacle and between the ribs 41 to establish a properly seated relationship of the parts. In this connection it will be observed that incident to the straight nature of the flange portions 43 and 47, no difficulty will be experienced in so establishing this relationship.

As shown in Fig. 17 a strip of material 49 of plastic or otherwise may be turned out in flat or other form and provided with side edge portions 50 which are undercut as at 51 to furnish a channel. Such a strip may be secured as in Fig. 15 to the inner face of the receptacle 20 by cement or in any other desired manner. A bowed slide or member 52 may be associated with body 49 by sliding or any other desired mounting action. As in Fig. 16 the strip 53 might be provided with outwardly extending beads or lip portions 54. It will be similarly secured to the receptacle 20. The slide or member 55 may again be formed of any desired material and have inturned edge portions 5} which cooperate with the beads or lips 54 so as to provide a proper channel.

As in Figs. 13 and 14 the inner face of the receptacle 20 may be provided with inwardly extending flanges 57 to define a channel. In line with the latter an extension 58 of the receptacle is furnished above the upper edge of the latter. A slide or member 59 of suitable material is received between the flanges 57 and has its upper end bowed outwardly. Its side edges are defined by flanges 60 which may be in spaced relationship with respect to the face of extension 58. It is obvious that with the parts properly positioned a channel 61 is furnished which extends from a point adjacent the upper edge of the receptacle 20 to a point adjacent the base of the same at which latter point it is preferably notched as at 62. As the upper ends of the parts defining the channel 61 are inserted into the mouth of the user and the latter applies pressure, the space between the flanges 60 and part 58 will be closed so that the device will function in a satisfactory manner. The removal of the member or slide and its reapplication are of course obvious.

In its simplest form the invention may include a tube 63 having a beveled end 64 which may also be notched. The upper end of this tube is offset as at 65 to provide a laterally extending portion as aforedescribed. A band 66 of a suitable material may encircle the tube at a point below this latter portion and be provided with a clip 67. The latter will overlie the outer surface of the receptacle and thus provide for detachable association of the tube with the latter.

In this connection it will be understood that while in the several forms of the invention as illustrated and described, the tube or channel is at least partially defined by a separable portion such as the slide, this need not be the case. In other words with the use of proper materials and technique, the tube might, in effect, be integral with the body of the receptacle.

Thus, among others, the several objects of the invention as aforenoted are achieved. Obviously numerous changes in construction and rearrangement of the parts might be resorted to without departing from the spirit of the invention as defined by the claim.

I claim:

A beverage appliance including in combination a receptacle presenting a base and a side wall extending upwardly therefrom, a pair of spaced elements affixed to the inner face of said side wall, an extended portion integral with said wall and extending above the upper edge of the same at a point between said elements and a member detachably mounted by said elements and having a length substantially equal to the height of said receptacle and extension, said member providing in conjunction with said elements and extension a channel extending from a point adjacent said base to a point adjacent the upper edge of said wall.

RICHARD H. HUCKNALL.

REFERENCES CITED

The following references are of record in the file of this patent:

UNITED STATES PATENTS

| Number | Name | Date |
|---|---|---|
| 154,305 | Weare et al. | Aug. 18, 1874 |
| 244,551 | Clayton | July 19, 1881 |
| 293,190 | Moore | Feb. 5, 1884 |
| 434,452 | Matthews | Aug. 19, 1890 |
| 478,861 | Howard | July 12, 1892 |
| 621,944 | Ring | Mar. 28, 1899 |
| 955,519 | Lazarus | Apr. 19, 1910 |
| 960,492 | Brinser | June 7, 1910 |
| 1,146,573 | Jacobs | July 13, 1915 |
| 2,263,947 | Gottfried | Nov. 25, 1941 |

FOREIGN PATENTS

| Number | Country | Date |
|---|---|---|
| 533,631 | France | Dec. 17, 1921 |